United States Patent [19]

Kantor et al.

[11] 4,370,641
[45] Jan. 25, 1983

[54] ELECTRONIC CONTROL SYSTEM

[75] Inventors: Sherwood Kantor, Longmont, Colo.;
Randall A. Maddox, Lexington, Ky.;
Paul S. Yosim, Lafeyette, Colo.

[73] Assignee: International Business Machines Corporation, Armonk, N.Y.

[21] Appl. No.: 66,740

[22] Filed: Aug. 15, 1979

[51] Int. Cl.³ ............................................. G06K 9/32
[52] U.S. Cl. ............................ 340/146.3 H; 250/208; 250/578; 340/146.3 F; 358/212
[58] Field of Search ................ 340/146.3 F, 146.3 H, 340/146.3 MA, 146.3 AG, 146.3 ED, 146.3 AH, 146.3 R; 358/212, 213, 293, 294, 280, 139, 204, 51, 163; 250/208, 578; 315/370

[56] References Cited

U.S. PATENT DOCUMENTS

| | | | |
|---|---|---|---|
| 3,231,860 | 1/1966 | Chatten | 340/146.3 |
| 3,576,534 | 4/1971 | Steinberger | 340/146.3 |
| 3,593,286 | 7/1971 | Altman | 340/146.3 |
| 3,710,323 | 1/1973 | Andrews et al. | 340/146.3 H |
| 3,811,110 | 5/1974 | Inose et al. | 340/146.3 MA |
| 3,820,069 | 6/1974 | Krewson et al. | 340/146.3 F |
| 3,831,146 | 8/1974 | Rundle | 340/146.3 H |
| 3,883,848 | 5/1975 | Minck et al. | 340/146.3 H |
| 3,885,229 | 5/1975 | Negita et al. | 340/146.3 H |
| 3,925,760 | 12/1975 | Mason et al. | 340/146.3 ED |
| 3,962,681 | 6/1976 | Requa et al. | 340/146.3 H |
| 3,967,243 | 6/1976 | Kawa | 340/146.3 H |
| 4,005,285 | 1/1977 | Price | 250/208 |
| 4,009,388 | 2/1977 | Seachman | 250/208 |
| 4,092,632 | 5/1978 | Agulnek | 340/146.3 F |
| 4,147,928 | 4/1979 | Crean et al. | 340/146.3 F |
| 4,200,788 | 4/1980 | Agulnek | 250/578 |
| 4,204,193 | 5/1980 | Schroeder | 340/146.3 H |
| 4,225,217 | 9/1980 | Smith | 340/146.3 H |
| 4,234,890 | 11/1980 | Astle et al. | 358/163 |
| 4,249,217 | 2/1981 | Korte et al. | 358/294 |
| 4,272,756 | 6/1981 | Kakumoto et al. | 340/146.3 H |

Primary Examiner—Leo H. Boudreau
Attorney, Agent, or Firm—Joscelyn G. Cockburn

[57] ABSTRACT

Dimensional variations, such as skew, alignment and abutment, in an array scanner are corrected by scanning and storing into a storage means an uncorrected electronic image generated from a test pattern. Correctional factors are generated from the stored electronic image. The correctional factors are used to correct the dimensional variations in the electronic image of the test pattern and/or dimensional variations in subsequent electronic image outputted from the scanner.

23 Claims, 18 Drawing Figures

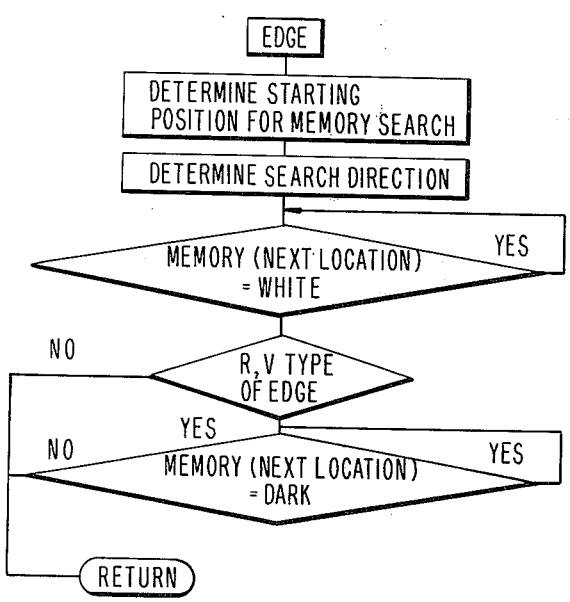
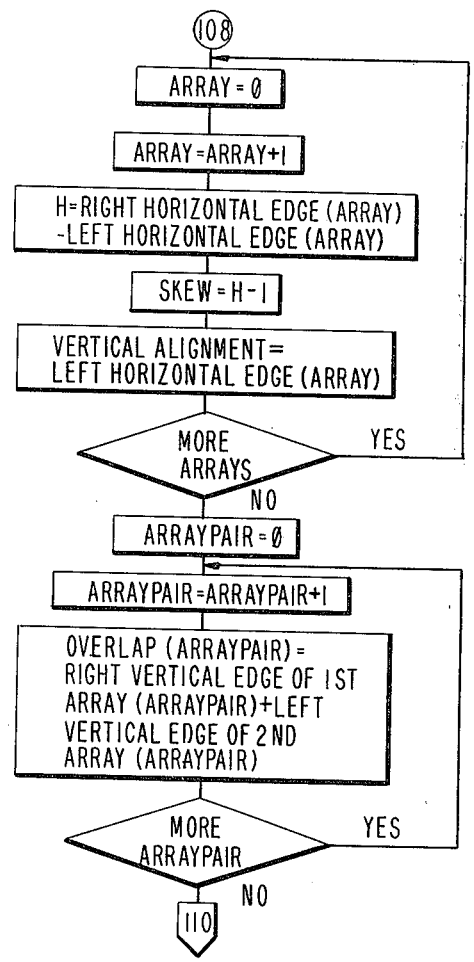
FIG 9                    FIG 10

ELECTRONIC CONTROL SYSTEM

CROSS REFERENCE TO RELATED PATENT APPLICATION

Application Ser. No. 43,208 filed May 29, 1979 in the name of E. C. Korte et al (now U.S. Pat. No. 4,249,217) and entitled "SEPARATED SENSOR ARRAY ABUTMENT" discloses a method and an apparatus for effectuating abutment in a multiple array scanner.

BACKGROUND OF THE INVENTION

1. Field Of The Invention

The present invention relates to scanners and, more particularly to scanners having single or multiple arrays wherein an electronic image of an original document is generated from the arrays. The electronic image is processed to reconstruct a copy of an original document.

2. Description of The Prior Art

The use of scanners for generating electronic images of an original document is well known in the prior art. Prior art scanners may be classified into two groups. The so called low resolution scanners and the so called high resolution scanners.

In the low resolution scanners a straight line of information of an original document is projected onto a linear diode array. The linear array outputs a video signal representative of the line of information on the original. With the low resolution scanners only one linear array is used to reproduce a continuous line of data on an original document.

With the high resolution scanners two or more linear arrays, such as diode arrays, are used for generating the video signal for a straight line of data on an original document. In order to achieve the high resolution each character on a straight line of an original document is divided or partitioned into a plurality of Picture Elements (PEL). A typical PEL size is within the range of several microns. Each PEL is projected onto a diode, or other photosensitive element in the arrays. As such, a relatively large number of diodes are needed to reproduce a video signal of a straight line of data on an original document.

It would be desirable to have the large number of diodes or other sensing elements required for the high resolution scanner packaged in a linear array. However, due to limitations imposed by the physical size of the scanner, the mechanical configuration of the arrays and, more important due, to limitations imposed by the solid state or semi-conductor technology (that is the manufacturers of the arrays) the number of diodes positioned linearly on a substrate (that is the length of an array) is fewer than the number of diodes necessary to reproduce a high resolution copy of a continuous line on an original document.

The aforementioned imposed limitations are overcome by projecting one continuous line of a document onto a plurality of linear arrays. With respect to a straight line of data running from left to right on a page, the arrays are positioned in an over-lapping offsetting fashion. Stated another way, in order to generate a video signal representative of a straight line of data extending from a left margin to a right margin of an original document, a first linear diode array is positioned so as to cover a portion of the line. A second linear diode array is positioned so that the beginning of the diodes in the second linear arrays overlap with the diode of the first linear array. Likewise, a third and N linear arrays are arranged in a fashion similar to that described for for the first and second arrays. In other words, a plurality of arrays are arranged to cover a continuous line of data on the original document. Usually the arrays are offset with respect to one another in the direction of scan. Also the arrays are overlapped in a direction parallel to a line on the original document. By way of prior art example, U.S. Pat. Nos. 4,005,285 and 4,092,632 give a more detailed description of a multiple array scanner.

When video data is reproduced by the aforementioned multiple arrays scanner, several types of dimensional variations or errors are associated with the video data.

One type of error which is associated with the prior art multiple array scanners is the so called abutment error. The abutment error usually occurs at the juntion point or crossover point of successive arrays. The abutment error generally manifests itself in two forms. In one form the video information at the crosspoint is redundant. The redundant information arises because for some finite period of time the overlapped element of the arrays are reading the same information. The other form by which the alignment error manifests itself is that of separation. This means that the video output from succeeding arrays are separated by a gap.

Another type of error which is usually associated with multiple array scanners is the so called misalignment error. As was stated previously, with a multiple array scanner each line of data on an original document is reproduced by the composite output from a plurality of arrays. Due to misalignment between the arrays or misalignment between the original document and the arrays the output from each array is offset relatively. Usually the offset is in the direction of scan.

A third type of error which is associated with the multiple array scanners is the skew error. With the skew error the video data outputted from the array is rotated relative to a center line or reference point taken horizontally across the document plates. The skew may be positive or negative depending on its position relative to the center line.

Of all the above described dimensional defects associated with multiple array scanners, only one (the so called skew defect) is associated with the single element array scanners. The invention described hereinafter can be used with single element array scanners to correct the skew associated therewith.

Although the dimensional defects (such as skew, abutment, and alignment) are well known to the prior art, only the abutment and alignment defects are addressed. To date no prior art could be found in which the skew defect is addressed.

One method used in the prior art to effectuate alignment is that each of the arrays in the direction of scan, is offset a predetermined distance from a start of scan line. The individual distance for each array is determined and stored in a series of offset counters. Each of the counters are associated or dedicated to each array. The offset counters serve, at the start of a scan, to delay activation of the arrays until the distance associated therewith is traversed.

In order to effectuate abutment between data outputted from the different arrays scanning a straight line of an original document, a vernier scale is fabricated on one of the arrays. The vernier scale is located at one end of the array. The vernier array is positioned relative to the non-vernier array so that the vernier scale is located at the overlapping zone of the arrays. The vernier scale is achieved by placing the photosensitive elements of the vernier section at a center-to-center distance which is shorter than the center-to-center distance of the photosensitive elements in the non-vernier section of the arrays. The reduction in center-to-center distance between elements in the vernier section of the array provides at least one point where successive arrays are in alignment. The point is called the crossover point. The crossover point is determined by microscopic examination of the arrays. By way of example, a more detailed description of the prior art method of correcting abutment and alignment is given in U.S. Pat. No. 4,092,632.

Although the prior art approach to correcting defects associated with multiple array scanners appears to perform satisfactorily, it is lacking in some respect. For example, the prior art does not address all of the dimensional defects associated with multiple array scanners. More particularly, the prior art does not correct the defect in a reproduced document due to skew.

Moreover, in order to correct for abutment at least one of the arrays has to be custom made in order to have the reduced center-to-center distance needed in the vernier portion of the array. As is well known to those skilled in the art, custom built electronic components tend to be much more expensive than off the shelf components. Expensive components tend to increase the overall cost of the system.

Another problem associated with the prior art is that the correction scheme is a static one. However, the forces or factors which influence the above dimensional variations are due to mechanical inaccuracies. These inaccuracies occur during initial set up, and mechanical instability due to time, temperature and mechanical shock. Since the factors are dynamic it would be expedient and more efficient to have a dynamic method to correct the dimensional variation associated with multiple array scanners.

SUMMARY OF THE INVENTION

It is, therefore, the object of the present invention to generate a control system which effectuates abutment, alignment and skew in a scanner.

It is another object of the present invention to effectuate abutment and alignment in a multiple array scanner in a more efficient manner than was heretofore possible.

The above drawbacks in the prior art multiple array scanners are overcome and the above objects are achieved by the present invention which uses electronic means to automatically abut, align and remove skew from a line of scanned data.

More particularly, the system according to the present invention includes a predetermined test pattern positioned at the document glass or object plane of the scanner. The test pattern is representative of a reference for a straight line and a reference for an abutment. The test pattern includes two mutually perpendicular lines. One of the lines, preferably the horizontal line, is used to achieve alignment and/or skew. The other line, preferably the vertical line, is used to correct the abutment. The test pattern is scanned, by the scanner, and stored in a memory. A pointer mechanism is associated with the memory. The pointer mechanism identifies storage location where information representative of a straight line is stored.

The memory and the pointer mechanism are controlled by a controller. The controller reconstructs a straight line based on the data representing the test pattern. In reconstructing the straight line the controller generates a plurality of error counts indicative of skew, mis-alignment and abutment. The controller uses the error counts to reconstruct straight lines of data as the data is read into or read out of the memory.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 9 is a functional flow chart of a subroutine for determining a function referred to in the flow chart of FIG. 8.

FIG. 10 shows a functional flow chart for calculating the error parameters.

DESCRIPTION OF THE PREFERRED EMBODIMENT

Figure 1:
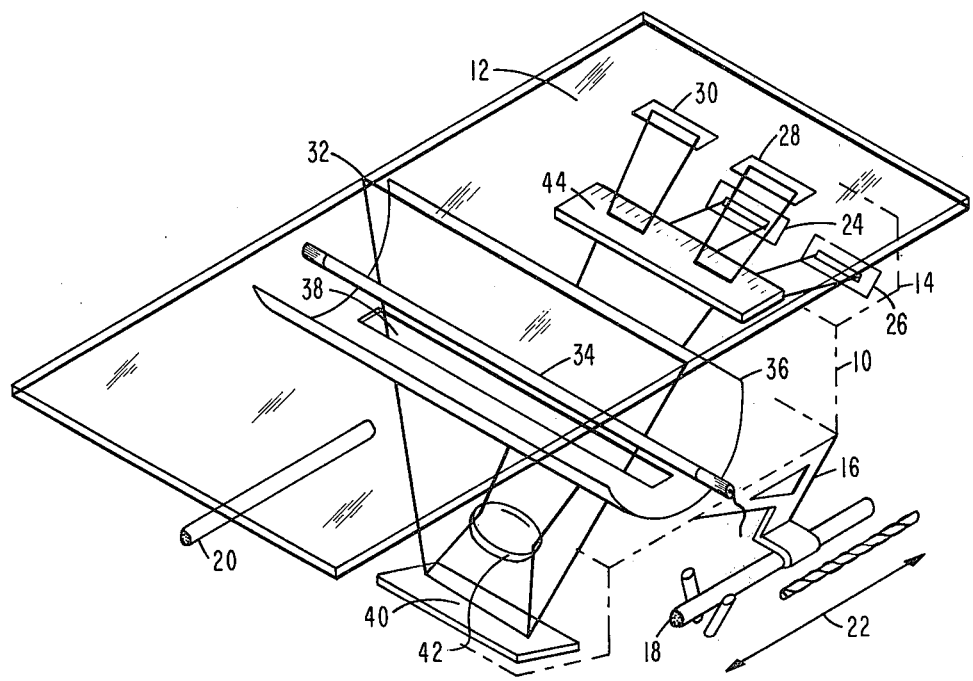
FIG. 1 shows a schematic view of a multiple array scanner.

Referring now to FIG. 1, an examplary raster input scanner 10 is there shown. The examplary showing of FIG. 1 depicts only the necessary elements of the scanner. It should be understood that conventional components such as support frame, motive means, etc. can be easily supplied by people skilled in the scanner art. The scanner 10 includes a document platen 12. The document platen 12 is usually transparent and forms the object plane for the scanner. Documents to be scanned and reproduced are placed with the side containing the material to be reproduced facing downwardly as the moving assembly 14 scans the document. The moving assembly 14 is fixedly attached to support plate 16. The support plate 16 is journaled onto support rods 18 and 20 for slidable motion in the direction shown by arrow 22. The motive force for transporting the moving assembly along rods 20 and 22, respectively, are supplied by a motor via a lead screw none of which is being shown in the figure.

Still referring to FIG. 1, the moving assembly includes an optical assembly and the linear arrays 24, 26, 28 and 30 respectively. As will be explained subsequently, for any line such as line 32 positioned on the document platen a composite optical image is projected onto the multiple arrays. Although four arrays are shown in FIG. 1, any line of data, for example 32, on a document can be covered by two arrays. In fact, for simplicity of explanation the present invention will be described using only two arrays to cover the width of a data line positioned on the document platen.

Still referring to FIG. 1, the optical assembly includes an illumination source 34. The illumination source illuminates a document which is placed on the document platen 12 for copying. The illumination outputted from the illumination source is reflected onto the document platen by the reflector 36. The reflector 36 is fitted with an elongated slot 38. As light rays are reflected from the document platen due to the non light absorbing characteristics of indicia situated on said document platen, light rays are reflected from the document through slit 38 and onto folding mirror 40. The folding mirror folds the light rays and directs them onto focusing lens 42. The lens directs the light rays onto an optical splitter 44. The optical splitter divides the light rays so that for any pair of scanner, for example 24 and 30, or 26 and 28 a finite portion of the object is projected onto identical pixels in each array. Although not obvious from the drawing, the pixels which are representing adjacent sections of a continuous object such as line 32, seated on the document plane, are arranged in different plane and in overlapping manner. It is worthwhile noting that although a specific scanner configuration is described it should be noted that the present invention finds use with any type of multi-array raster scanners. For example, the raster scanner described in U.S. Pat. No. 4,092,632.

As was stated previously, for ease of explanation each continuous object such as line 32 seated at the document plane will be projected onto two overlapping arrays such as arrays 24 and 28. However, any number of arrays may be used to cover the width of a line.

Although FIG. 1 shows a schematic of a scanner with four linear arrays for scanning a continuous line of information on a document positioned at the document plane, for ease of description it will be assumed that each line of continuous information is reproduced by two overlapping arrays.

Figure 2:
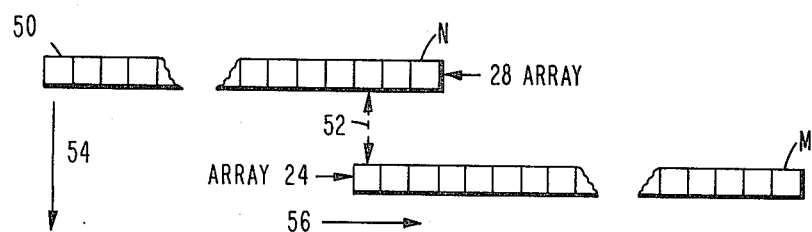
FIG. 2 is an exemplary showing of the overlapping arrangement of the arrays.

Referring now to FIG. 2, array 28 and array 24 are arranged in overlapping manner as is shown. Array 28 is a standard conventional array including a plurality of pixels or pel 50 through N. Likewise, array 24 includes pixels 52 through M. The pixels are arranged linearly on a substrate to form an array and the arrays can be purchased off the shelf. The pixels are arranged in overlapping manner so that redundant information regarding points on an object placed at the document glass of the scanner is projected onto the overlapping area. One suitable type of array which may be used for array 28 and array 24 is the Fairchild CCD121-1728 pixel two phase linear array manufactured by Fairchild Corporation. Of course, any other type of linear array having any desired number of pixels may be used. The arrays are offset with respect to one another in the direction shown by arrow 54. The offset direction, that is the direction shown by arrow 54, is the direction of scan for the scanner. By overlapping the array in the direction parallel to a scanned line, that is the direction shown by arrow 56, the effect is that a composite unbroken array is formed. The composite unbroken array is used for generating a video image of a continuous line positioned on the document plane.

Figure 3:
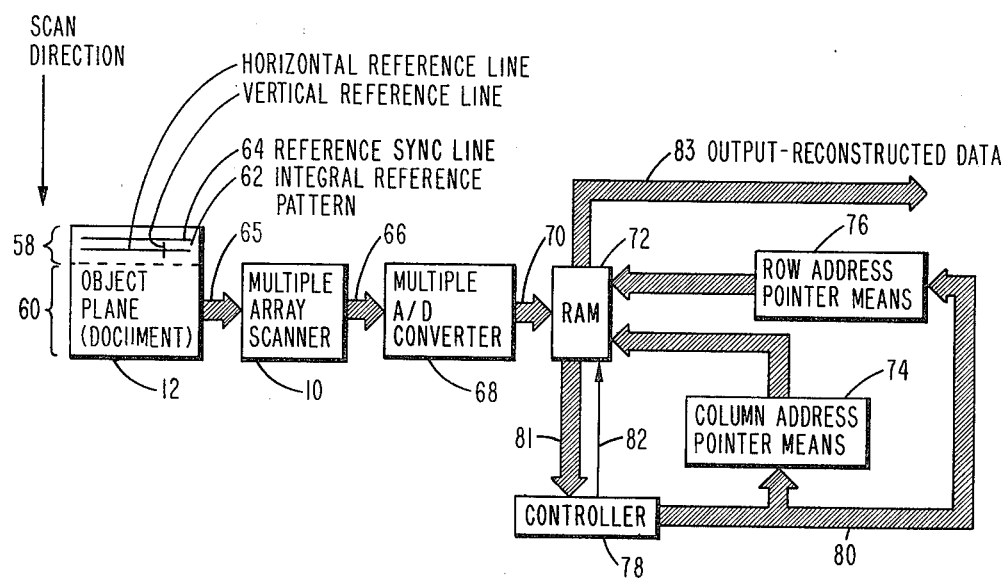
FIG. 3 is a schematic showing the inter-relation between the components according to the teaching of the present invention.

Referring now to FIG. 3 a system flow diagram, according to the teaching of the present invention, is shown. In this figure elements which are identical with elements previously described will be identified with common numerals. The system includes a document platen 12. The document platen forms the object plane of the scanner. The document platen which is usually transparent supports an original document whose image is to be focused onto the multiple arrays such as arrays 28 and 24 of FIG. 1. The document platen 12 is divided into a controlled area 58 and a non controlled area 60. The non controlled area is the area in which a document to be reproduced is positioned with the printed side downwards. The controlled area 58 is the area carrying a test pattern from which the abutment error, the alignment error and the skew error for a particular scanner is generated. As will be shown hereinafter, the errors are used by the controller 78 to generate a continuous image line of a document line positioned at the object plane.

The controlled area of the document platen is fitted with an integral reference test pattern 62. The integral referenced test pattern includes a vertical reference line and a horizontal reference line. The vertical and horizontal reference lines intersect at right angles. The point of intersection between the two lines is the expected junction of the overlap zone between the arrays. As will be explained more fully hereinafter, the vertical line is used to determine the cross over point from one array to the next. Similarly, the horizontal line is used to determine skew and alignment. Reference sync line 64 is a horizontal line positioned within the controlled area of the document plane. As will be described hereinafter, the reference sync line is used by the controller to determine when data from the controlled area is to be loaded into memory. Of course, it is within the skill of the art to use other reference means without departing from the scope of the present invention.

The document platen is connected by optical path 65 to multiple array scanner 10. The optical path 65 is fitted with a plurality of optical instruments such as a focusing lens, mirrors, splitters, etc. The optical path receives light rays from objects at the object plane and transmit the same onto the multiple arrays of multiple array scanner 10. The multiple array scanner 10 includes a plurality of arrays arranged in overlapping fashion and the light which is outputted from optical path 65 for each scan line at the document plane is focused onto the arrays. Each pixel in the array outputs a video electrical signal which is fed over multiplexor buss 66 into multiple analog to digital (A/D) converter 68. The A/D converter 68 converts the output from each of the pixels into a digital signal. The signal is transmitted over multiplexor buss 70 for storage in a random access memory (RAM) 72. The RAM is a two dimensional RAM. This means that it can be addressed row wise and column wise. In other words, a storage location in the RAM is determined by a row and a column address. The size of the RAM, that is the addressable cells, are such that a full page positioned at the document platen can be mapped (that is stored) identically in the RAM. The addresses where data from multiplexor buss 70 is stored in the RAM is selected by column address pointer means 74 and row address pointer means 76.

A controller 78 load address over multiplexor buss 80 into the column address pointer means 74 and the row address pointer means 76. The controller 78 outputs control information on line 82. This controlled information informs the RAM that data stored therein must be transferred over multiplexor buss 81 to the controller. The data which is transferred to the controller is used by the controller to determine the skew error, the abutment error and the alignment error. The value for these errors is then outputted over multiplexor buss 80 to the column address pointer means 74 and the row address pointer means 76. The column address pointer means 74 and the row address pointer means 76 generates new RAM addresses where data coming in on buss 70 is stored so that a continuous electronic image of a straight line scanned at the document platen is reconstructed in the RAM. The reconstructed data is then transmitted from the RAM on multiplexor buss 83.

Figure 4A:
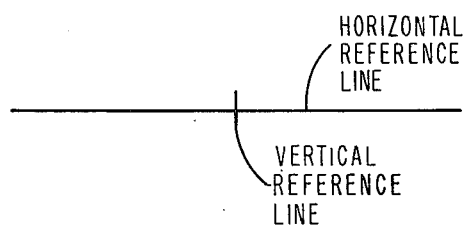
FIGS. 4a, 4b, 4c and 4d show a graphical representation of the reference pattern and the electronic image generated from the reference pattern. The figure is helpful in understanding the problems which are corrected by the present invention.
Figure 4B:
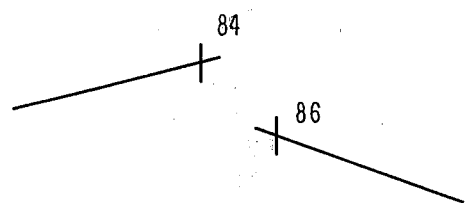

Before describing the components 74, 76 and 78 in greater detail, it is worthwhile describing how the integral reference test pattern 62 appears in the RAM prior to reconstruction. The representation is shown in FIGS. 4a, 4b, 4c, and 4d. It should be noted that in reality the integral reference test pattern is stored in the RAM as an electronic image (that is discrete digital values) rather than graphically as is shown in FIG. 4. However, for purposes of discussion it will be assumed that the image in the RAM or any other storage means is a line. FIG. 4a shows the integral reference test pattern including the vertical reference line and the horizontal reference line. By imaging the integral reference pattern through the scanner, the dimensional defects (that is, skew, alignment and abutment) of the scanner is transmitted in the electronic images 84, and 86, respectively, which are outputted from the arrays of the scanner. For purposes of description it will be assumed that only two overlapping arrays are used in the scanner. Of course, the present invention is useable with any number of arrays which one elects to use in a scanner. The present invention is to determine the correction factors needed and apply them to the images 84 and 86, respectively, so that the image has the same orientation as the object in FIG. 4a. As will be used hereinafter, the image 84 will be identified as the left image generated by a left array while image 86 will be identified as the right image generated by a right array. The left array and the right array are arranged to cover a line of data on an original document position at the document plane. With respect to FIG. 2, the right array is array 24 while the left array is array 28.

Figure 4C:
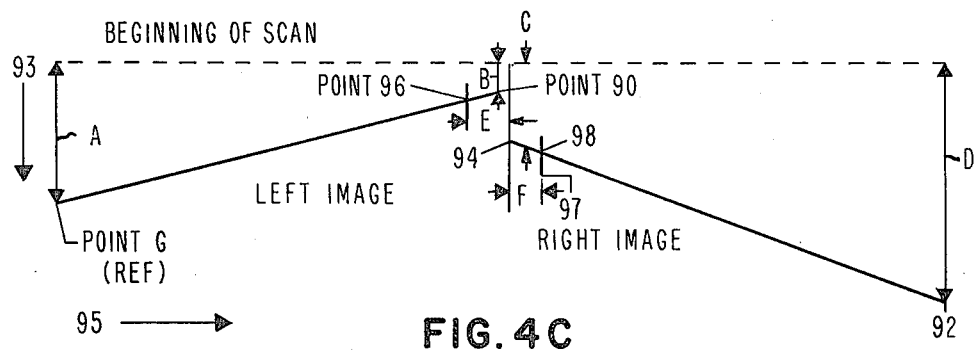

FIG. 4c shows a map of the memory or storage means and the geometrical orientation of the left image and right image, respectively. The left image and the right image are orientated with respect to a beginning of scan line. The controller 78 scans the left image and the right image in memory and determines values for A,B,C,D,E and F. By arbitrarily selecting the left edge of the left image (point G) as the reference point and applying simple geometry, it can be seen that the following expressions can be used to identify the skew error, the alignment error and the abutment error:

Skew (Left image) = A − B    (Equation 1)

Skew (Right Image) = C − D    (Equation 2)

Alignment = A − C    (Equation 3)

Abutment = E + F    (Equation 4)

Figure 4D:
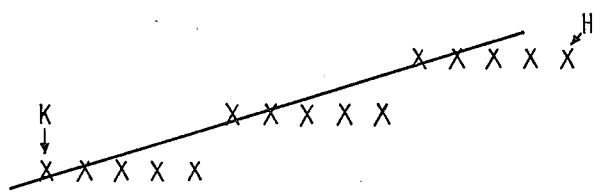

By empirical means it was determined that a skewed array of Length L, that images the right most pixel H higher than its left most pixel K will create an image comprising (H+1) collinear segments, each collinear segment having a Length L divided by (H+1); where each segment is displaced vertically by one element from the adjacent segment. This empirical phenomenon is demonstrated in FIG. 4d. The example in FIG. 4d is a 15 element array with a skew of 2. If the image is stored in memory and one wishes to read it out with skew correction, then knowing the segment length, one can read out one segment from a row in memory, move up one row in the vertical and horizontal plane, respectively, to read out another segment. This process continues for the length of the array. In the above, H is called the skew while (H+1) is the skew correction factor.

Returning to FIG. 4c for the moment, and as was previously stated, the alignment error is calculated by A−C. This means that the alignment errors are handled by a constant offset between the row addresses in memory where the two array images are stored. Likewise, abutment errors are handled by ignoring excess or redundant pixel, at the overlap zone, either while storing in or reading out of memory.

As was described previously, by scanning the integral reference test pattern 62, FIG. 3, with a multiple array scanner 10 having at least two arrays arranged in overlapping manner so as to scan a continuous line on the document plane, dimensional variations such as skew, abutment and alignment associated with the scanner will be generated in the electronic image of the integral reference test pattern. The left image, in FIG. 4c, is generated by the left array while the right image is generated by the right array. Once the electronic images are stored in memory the errors for correcting skew, misalignment and abutment are easily determined.

In one embodiment a beginning of scan line is placed in memory. The beginning of scan line is established from the reference sync line 64 (FIG. 3). The reference sync line is placed in the control area of the document glass. As will be described subsequently, the beginning of scan line in the memory is free of the dimensional variations associated with the scanner because of controlling the memory address at which the information is placed. With the electronic images of the integral reference test pattern in memory, the errors are determined by identifying various points on the stored electronic image (FIG. 4c). The point are located relative to the beginning of scan. Point G is called the left horizontal edge (left image).

Point 90 is next determined. Point 90 is hereinafter referred to as the right horizontal edge (left image). The values for the left horizontal edge and the right horizontal edge are calculated and stored.

Point 92 is determined. Point 92 is hereinafter referred to as the right horizontal edge (right image). Likewise, point 94 is determined. Point 94 is hereinafter called the left horizontal edge (the right image). Next point 96, hereinafter called the left vertical edge (left image) is determined. Next point 98, hereinafter called the right vertical edge (right image) is determined. The value for each of the points is stored. By substituting these values in the above identified equations 1 through 4, the error associated with skew, abutment and alignment is determined. The error values are then loaded by the controller into the column addressed pointer means 74 and the row address pointer means 76 (FIG. 3). The error values are used to determine the storage location where a reconstructed straight line of the integral reference test pattern must be stored. Having determined these correction factors, the factors are used thereafter to allocate storage address so that for each line of data scanned from an original document, the information is stored as a continuous straight line of data in the memory. Of course, the correction on the data may be performed when the data is read out from memory.

In one embodiment of the present invention, controller 78 (FIG. 3) which calculates the above mentioned values and generates the correction factor (that is errors) for setting up the column address pointer means 74 and the row address pointer means 76 is a micro-computer. Any of the well known prior art conventional micro computers can be used for generating the errors. By definition a micro-computer includes a microprocessor connected to a RAM and I/O registers, etc. In the embodiment according to the present invention, the microprocessor is an Intel 8080A microprocessor. The microprocessor is connected to a conventional RAM. The combination of the microprocessor and RAM which form the micro computer is manufactured by the Intel Corporation. Details of the microprocessor layout instruction set and other programming information is given in a publication entitled: "Intel Component Data Catalog 1978".

It is worthwhile noting that RAM 72 (FIG. 3) is external to an independent of the RAM forming part of the micro-computer. The micro-computer (controller 78) is connected to RAM 72 via column address means 74 and row address means 76.

Control information to RAM 72 is sent over buss 82. The information on buss 82 merely informs RAM 72 to send data on buss 81 to the micro-computer. It should be noted that it is within the skill of the art to program the micro computer in a plurality of different ways so as to determine each of the above reference points and ultimately calculate the errors. With this in mind, a set of flow charts showing the logical steps which may be followed by order to determine the necessary points will now be described. From the flow chart an artisan having ordinary skill in the programming art can generate a program using the Intel 8080A instruction set. The program is then assembled by the assembler of the Intel 8080A whereby machine language is generated and the necessary points are calculated.

Figure 12:
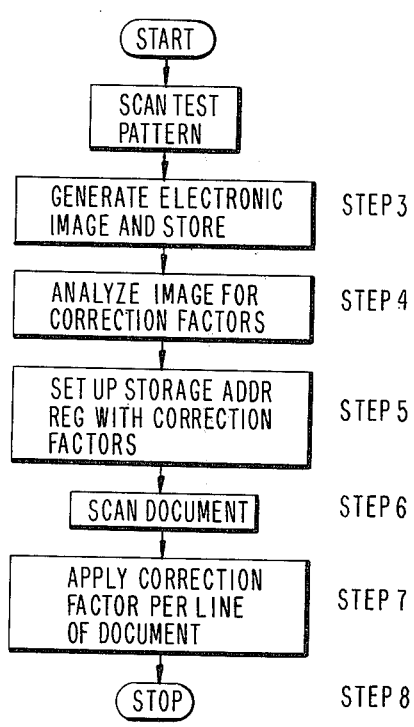
FIG. 12 shows a logical flow chart of the process steps necessary for reconstructing a continuous image of a scanned object. The flow chart shows the programmed steps for processing the test pattern and data thereafter.

Referring now to FIG. 12, a simplified flow diagram of a series of process steps necessary to effectuate correction in a line of data scanned by a multiple array scanner is shown. Each box represents a process step and will now be described in descending order. The start box merely signifies the microcomputer to be ready. The scan test pattern box informs the scanner to begin scanning. At this point the scanner scans the controlled area of the document glass (FIG. 3).

Step 3: In step 3 the electronics of FIG. 3 generates the electronic image equivalent to the scanned test pattern. The electronic image is then stored in the RAM.

Step 4: In step 4 the stored electronic image is interrogated by the microcomputer to determine the pertinent edges previously described. From the pertinent edges the skew correction factor the alignment correction factor and the abutment correction factor are determined.

Step 5: In step 5 the microcomputer sets up the column address pointer means 74 and the row address pointer means 76 with the factors previously determined from step 4.

Step 6: In Step 6 the scanner begins to scan the document on a per line basis.

Step 7: In step 7 the error factor which was previously determined in step 4 and 5 is applied to each line of data scanned from the original document to reconstruct a continuous image of said line.

Step 8: The process is completed.

Figure 13:
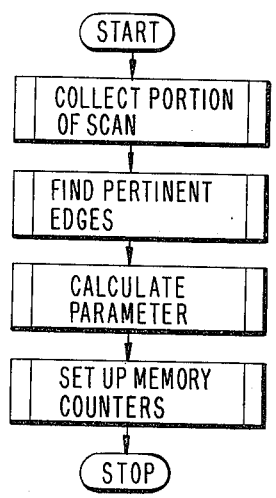
FIG. 13 shows a logical flow chart used to process the test pattern.

FIG. 13 shows a functional flow chart of a series of program steps necessary for scanning information from the controlled section of the document platen into the RAM and determining the error factor therefrom. In discussing the flow chart in descending order, the first step required that the microcomputer be started. Having started the microcomputer, the next step is to collect a portion of scan. The portion of scan which is referred to in this box is the information recorded in the control area of the document platen. The next step requires that the pertinent edges of the stored pattern be detected. The next step in order is to calculate the error parameters such as skew, misalignment and abutment. The next step in order requires that the memory counters which address the RAM be set up. After the completion of the set up function, the computer is stopped. The rectangular boxes with a double line on the left and right edges mean that the functions which are referred to in these boxes have to be generated from another program or a subroutine. Each of the subroutine programs will now be described.

Figures 7, 8:
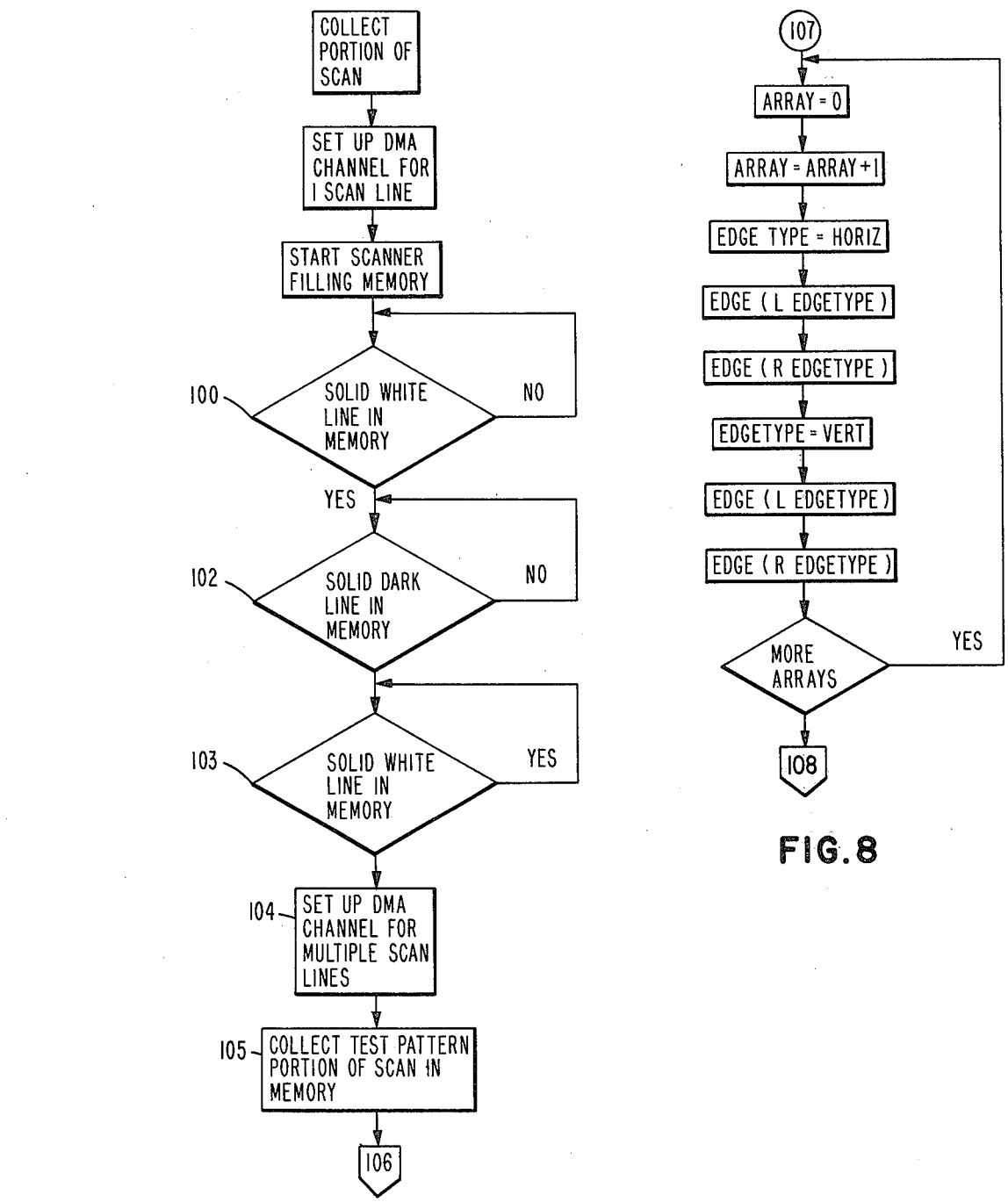
FIG. 7 is a functional flow chart showing the steps followed by a controller for setting up a storage memory prior to loading the electronic image of a reference pattern therein.
FIG. 8 shows a functional flow chart of the controller interrogating the storage memory to identify necessary and pertinent points associated with the electronic image.

FIG. 7 shows the program steps necessary to perform the function identified (in FIG. 13) as collect portion of scan. Each of the flow chart symbols in the program for collecting a portion of scan will be described in descending order.

The first step in the program is to set up the direct memory access (DMA) channel for one scan line. The purpose of this program step is to map into RAM 72 an electronic image of reference sync line 64 substantially as it is shown on the document platen 12 (FIG. 3). In FIG. 4c the reference sync line is identified as "beginning of scan". As was previously stated and will be explained in greater detail subsequently, the horizontal line in memory forms the reference point from which the various points needed on the electronic image of the integral reference test pattern will be calculated. Of course it is within the skill of the art to assign other reference points in memory without departing from the teaching of the present invention. As will be explained subsequently, the last element in the series of elements which forms the column address pointer means 74 (FIG. 3) and the row address pointer means 76 (FIG. 3) are counters. By setting the row counter to a fixed memory address and stepping the column counter portion of the electronic image representative of the sync line is maped into memory as a straight line substantially as is shown by the object line in FIG. 3. The next program step in FIG. 7 is to start the scanner filling in the memory. This means the scanner is scanning and numbers representative of the scanned reference line are outputted on buss 70 (FIG. 3). With the row address counter set at a fixed address and the column address counter being stepped, the horizontal beginning of scan memory line (FIG. 4c) is generated in memory.

The next three steps in order, that is step 100, 102 and 103 (FIG. 7) are decisional steps. The function of the decisional step is for the microcomputer to interrogate RAM 72 and determine the position of the reference sync line. The processor scans memory in the direction shown by arrows 93 and 95, respectively (FIG. 4c). In step 100 the processor, through the direct memory access channel searches the RAM for a solid white line. This search continues and the processor exits the loop into box 102 when the leading edge of the reference memory sync line is seen by the processor. Once this edge is determined, decisional box 102 forces the processor into a loop until the processor crosses over the width of the black line. As soon as the trailing edge of the black line is recognized by the processor, the processor enters decisional box 103. Again, in decisional box 103 the processor goes into a loop and searches a few memory rows to ascertain that the line is again white. Once the processor makes this determination that there is a white line followed by a black line and a white line, the location of the memory reference sync line is now determined.

Having determined the position of the referenced sync line in memory, the processor descends to step 104. In step 104 the processor sets up the DMA channel for multiple scan. This means that the setting in the row address counter and the column address counter of the RAM changes continually so that the data which is coming in and representative of the integral reference test pattern 62 (FIG. 3) will reflect the skew defect, the alignment defect and the abutment defect associated with the scanner. The next step is to collect the test pattern portion of scan in memory. This means that the test pattern is stored into memory.

With the reference pattern stored in memory, the program exits FIG. 7 at connector 106 and enters FIG. 8 at entry station 107. FIG. 8 depicts the next portion of the flow chart use to determine the location of the pertinent edges associated with the stored pattern.

FIG. 8 shows a flow diagram for finding the pertinent edges. It is assumed that at least two arrays are used to scan a line at the document plane. In FIG. 8 the programming flow chart is described in ascending order. Firstly, an index pointer called array is initialized to 0. As information related to each array is accessed, the array index pointer is advanced by means of the second step so as to point to that array. The next series of steps define the edge types for the array. The first Edge Type is the Left Horizontal Edge Type (Edge Type=-HORIZ). As such, the program sets a variable called Edge Type to indicate Horiz. As stated previously, there are two horizontal edge types associated with each array image in storage; namely, the left horizontal edge type [Edge (L, Edge Type=H)] and the right horizontal edge type [Edge (R, Edge Type=H)]. For the horizontal edge type a subroutine is called to find the left horizontal edge type (L, Edge Type=H). Also, a subroutine is called for the right horizontal edge type (R, Edge Type=H).

The next portion of the flow diagram involves determining parameters related to the vertical edge type (Edge Type=Vert). Hence the program sets the variable called Edge Type to indicate Vert. As with the horizontal edge type, a subroutine is called in the program to determine the location of the left vertical edge type (L, Edge Type=V). Also, a subroutine is called to determine the location of the right vertical edge type (R, Edge Type=V). After the subroutines to identify the values of the right vertical edge type the next program step is a decisional step identified as MORE ARRAYS. If more arrays are associated with the multiple array scanner then we loop back into the program along the feedback loop that enters into the Array=Array+1 box a number of times so that all the arrays in the scanner are accounted for. After the arrays are accounted for then the program exits at connector 108.

FIG. 9 depicts the flow chart for the subroutine which is necessary to determine the function Edge (FIG. 8) and described above. As with the previously described programming diagram, the programming step in FIG. 9 will be described in descending order. For each Edge, be it a vertical edge or a horizontal edge, first determine the starting position for a memory search. With reference to FIG. 4, the beginning of scan line is the starting position whose location is known in memory. If the search is for a horizontal edge, then the microcomputer will search the memory starting at the beginning of scan line and proceed downwards (direction of arrow 93). Likewise, if the edge is a vertical edge for the left image the search will begin at point 90 and progress towards the left of the page until the vertical edge is obtained. As for the vertical edge in the right image, the search begins at point 94 and progresses towards the right). It is worthwhile noting that the search for a vertical edge will begin at a point depending on the slope of the horizontal line. This is so because whichever point is selected, the micro computer attempts to search the memory in a straight lin and should access the vertical edge prior to intersecting the horizontal line. Having determined the starting position for memory search and the direction of search, by the first two program steps in FIG. 9, the next programming step, in order, is a decisional step identified as MEMORY (next location)=WHITE. This means that once the starting position is determined and the direction of search is determined, adjacent memory location is searched to determine if the contents therein is the same as the starting point. For example, if we were searching in memory for point G (FIG. 4c, the left horizontal edge, left image) then a column address would be forced into the column counter and a value such as the position of the beginning of scan forced into the row counter. The address in the column counter would be fixed while the address in the row counter is updated. By updating the contents of the row counter, adjacent memory rows are accessed. The process is continued until opposite values (0 followed by a 1 or visa versa) are determined at adjacent memory locations. At this point the processor exits the decisional box MEMORY (next location)=WHITE along the NO path into the decisional box called R, V Type Of Edge.

It is worthwhile noting that if the type of edge involved is not the R,V Type of Edge (that is a right vertical edge) then the program exits the R,V type of edge decisional box, along the NO line to the terminal return symbol in FIG. 8. However, if the edge involved is a right vertical type of edge or a left vertical type of edge such as 96 and 98 in FIG. 4c, depending on the direction of search in which the processor interrogates the memory in order to identify the same edge, then the processor has to search across the width of one of the vertical lines to register on the same edge. As such, the programming step in FIG. 9 requires that if a right vertical type of edge is accessed from point 94 (FIG. 4c) in a direction parallel to arrow 95 then once the first edge or vertical line 97 is obtained each memory location is examined in the same direction for a dark position. The process is continued until a light position is reached. Once the light position is reached the last dark position preceding the first dark position defines the right vertical edge for line 97. The processor exits the program (Memory (next location)=Dark) box along the No path into the return. The technique to search across the width of the line would be to fix a number (that is an address) in the row counter and step the column counter.

Referring now to FIG. 10, the flow chart for calculating the error parameters is shown. The parameters to calculate the skew error, misalignment error and abutment error. The entry point into FIG. 10 from FIG. 8 is point 108. The first program step is to set the index pointer called ARRAY to 0. In the next program step, ARRAY is set equal to ARRAY+1. The box identified as ARRAY=(ARRAY+1) together with the associated feedback loop will account for the Nth array in the array scanner. The next program step in order is to set H=Right Horizontal Edge (ARRAY)−Left Horizontal Edge (ARRAY). The microcomputer would perform the function for each array. As was stated previously and in describing FIG. 4d, H is identified as the skew and is obtained by finding the value for the right horizontal edge of each array and subtracting the value obtained for the left horizontal edge therefrom. The next step is sequence is a function identified as skew correction=H+1. This step is self explanatory and the attempt is to generate the skew correction factor. The next step is identified as Vertical Alignment=Left Horizontal Edge. This function generates the vertical alignment. That is the number of memory lines that one array has to be moved relative to the reference to achieve alignment. This is simply the value of the left horizontal edge of the array under consideration. It should be noted that if only one array is involved then there cannot be a vertical misalignment problem. After accounting for the total number of arrays, the program exits the MORE ARRAYS decisional block along the No line into a process box called ARRAY PAIR=0.

The next function in descending order is ARRAY PAIR=ARRAY PAIR +1. The error is to be determined is the overlap between the array pairs. The next processing step in order is OVERLAP ARRAY PAIR=Right Vertical Edge of 1st Array (ARRAY PAIR)+Left Vertical Edge 2nd Array (ARRAY PAIR). These values are already known, therefore, overlap is merely taking the sum of these values. In effect abutment is achieved by a write overprocess in the overlapping zone of the arrays. The next decisional step is to determine if there are more array pairs. If so, the process is performed along the yes feedback loop and the decisional box is exited along the No path to point 110. The above described error factors are stored in the processor for subsequent use.

Figure 14:
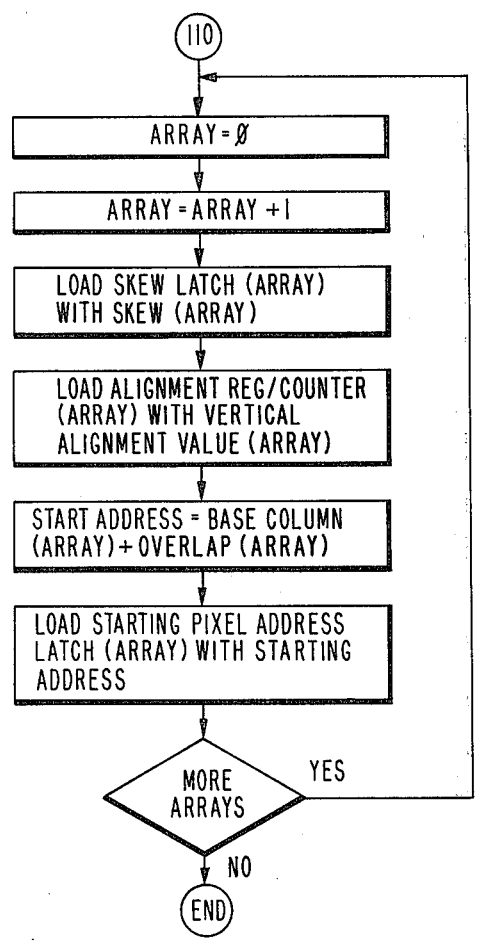
FIG. 14 shows a logical flow chart of the programming steps used to load the storage address registers.

FIG. 14 shows a program flow chart for setting up the row memory counters and the column memory counters. The point of entry into the flow chart of FIG. 14 is point 110, the exit point for FIG. 10. The first step is a function where array is set equal to zero. Next array is set equal to array+1. This step occurs for setting up the counters for the first array. For the first and subsequent arrays the progrem steps to be performed are: Load the skew latch with the skew correction factor. In the program step the function is identified as LOAD SKEW LATCH (ARRAY) With Skew (ARRAY). The next step is to Load Alignment Reg/Counter (Array) With Vertical Alignment Value (Array). This step will take the vertical alignment value previously calculated and load the same into the alignment register. The next program step is identified as Starting Address=Base Column (Array)+Overlap (Array). This step means that the absolute address of the array (dependent only on the number of pixels in the array and not on any errors) that will be used for reconstructing the electronic image is added to the overlap calculated between the two arrays to form the starting address. The next step in order is identified as Load Starting Pixel Address Latch (Array) With Starting Address. This means that the pixel address register is loaded with the starting address of the pixel. The next step in order is a decisional box captioned More Arrays. The exit from this box is along the Yes line for the second and Nth arrays where the same process steps are performed. Once the last array is accounted for the program exits from the decisional box along the NO path and the program ends. As was stated previously, access to RAM 72 is achieved by the colunn address pointer means 74 and the row address pointer means 76 (FIG. 3). The memory address to be accessed is loaded into the column address pointer means 74 and the row address pointer means 76 over multiplexer buss 80.

Figure 5:
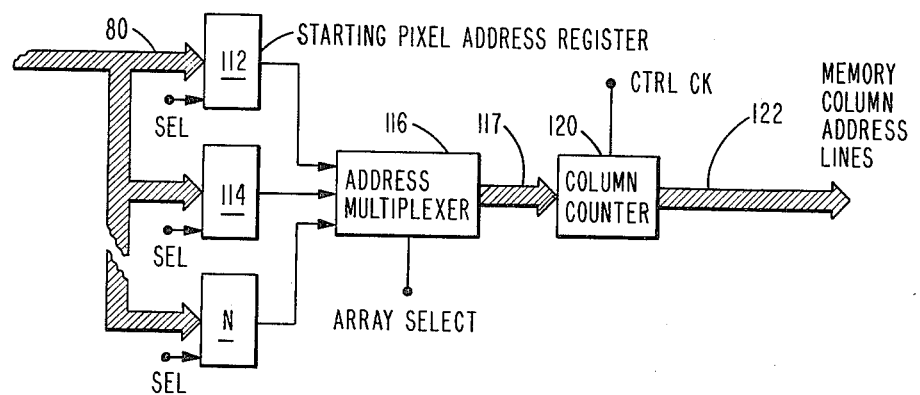
FIG. 5 is a schematic view of a column address pointer. The column address pointer identifies a column address in the memory where incoming data is stored. The column address pointer is utilized to correct abutment.

Referring now to FIG. 5, the elements of the column address pointer means 74 is shown in more detail. The column address pointer means 74 includes a plurality of starting pixel address registers 112 through N. Each of the starting pixel address registers is dedicated to a particular array of the array scanner. By way of example, where two overlapping arrays are used as in the present invention, starting pixel register 112 is dedicated to defining the starting RAM address for the data outputted from the first pixel of the first array while starting pixel address register 114 is dedicated for defining the beginning address for data outputted from the second array. Of course, if more than two arrays are used then N designates the last array.

The select (SEL) lines are simplex lines generated from the microcomputer and are connected to each of the starting pixel registers so as to permit loading of the registers on a selective basis by the microcomputer by means of a common data buss 80. The output from the starting pixel address registers are outputted via address multiplexor 116. The multiplexor 116 is controlled by the array select line. The array select line identifies the number of the array whose data is being transported to the RAM so that the proper starting pixel address register is selected by the address multiplexer 116. The output from the address multiplexer 116 is fed over multiplexor buss 117 into the high speed column counter 120. The column counter 120 is stepped by a control clock line until a particular line of scanned data is stored into memory. The count from column counter 120 is transported over memory column address lines 122 to the column select logic of the memory.

In operation the microcomputer outputs a memory starting address on multiplexor buss 80 for each array once during a scan, after the correction values have been computed. Simultaneously with the address on data buss 80, the microcomputer activates the simplex select line. The simplex select line enables in sequential order, the starting pixel address register corresponding to the particular array for which the memory starting address is to be loaded. The microcomputer loads registers 112, 114, N only once per entire scan. The values contained in the registers are accessed via MPX 116 for each scan line. The Array Select line and SEL line are control lines independent of each other. The Array Select line is set (by the selected array) to force the address multiplexor to choose the starting pixel address register corresponding with the array transmitting the video data. The contents, that is the starting address of the selected pixel address register 112 is transmitted over multiplexor buss 117 to the column counter 120. The column counter 120 is stepped by the CTRL CLK so that the data can be loaded in sequential rows in memory. Since the starting pixel address register includes the overlap between the arrays abutment error is corrected by the circuits of FIG. 5.

Figure 6:
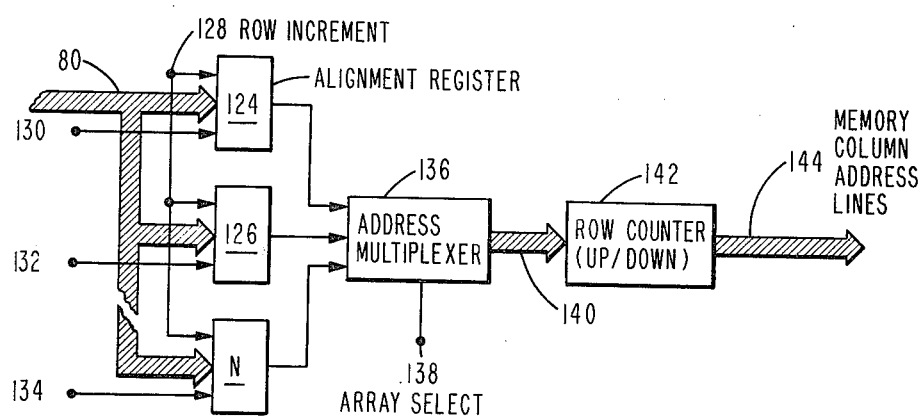
FIG. 6 is a schematic view of a row address pointer. The row address pointer identifies a row address in the memory for storing incoming data. The row address pointer is utilized to correct alignment and skew.

FIG. 6 depicts a portion of the detail of the row address pointer means 76. FIG. 6 shows the circuitry which controls the RAM to correct for alignment. This circuit, when loaded by the microcomputer loads the RAM so that vertical alignment in the data generated by the arrays is achieved. The row address pointer means 76 includes a plurality of alignment registers 124 through N. Each of the alignment registers is dedicated to one of the arrays in the array scanner. Row increment line 128 is a control line which is connected to the alignment registers. Each of the alignment registers are selected by control select 130, 132, and 134 respectively. The control select lines are generated by the microcomputer and identify the alignment register whose data is on the multiplexor buss 80. The output from the alignment registers are multiplexed into the address multiplexor 136. The address multiplexor 136 is enabled by the array select pulse 138. The output from the address multiplexor 136 is fed over multiplexor buss 140 into row counter 142. In the preferred embodiment of the invention the row counter is a conventional up-/down counter. From row counter 142 memory row address lines 144 presents the address for the memory row to the memory row address controller (not shown) to decode the address.

In operation the micro computer loads the alignment register 124 and 126 with the first row in memory to be accessed by corresponding arrays of the multiple array scanner. As each array is to be accessed the array select line 138 activates the address multiplexor 136 and the corresponding alignment register is selected. The value, that is the base address plus the alignment error, is multiplexed into the row counter where the information is transferred by the memory row address line to the particular row addresses in memory. After the data from the arrays covering a particular scanned line of the document is completed, the alignment registers are stepped one count with a control signal in row increment line 128 to point the next row in memory.

Figure 11:
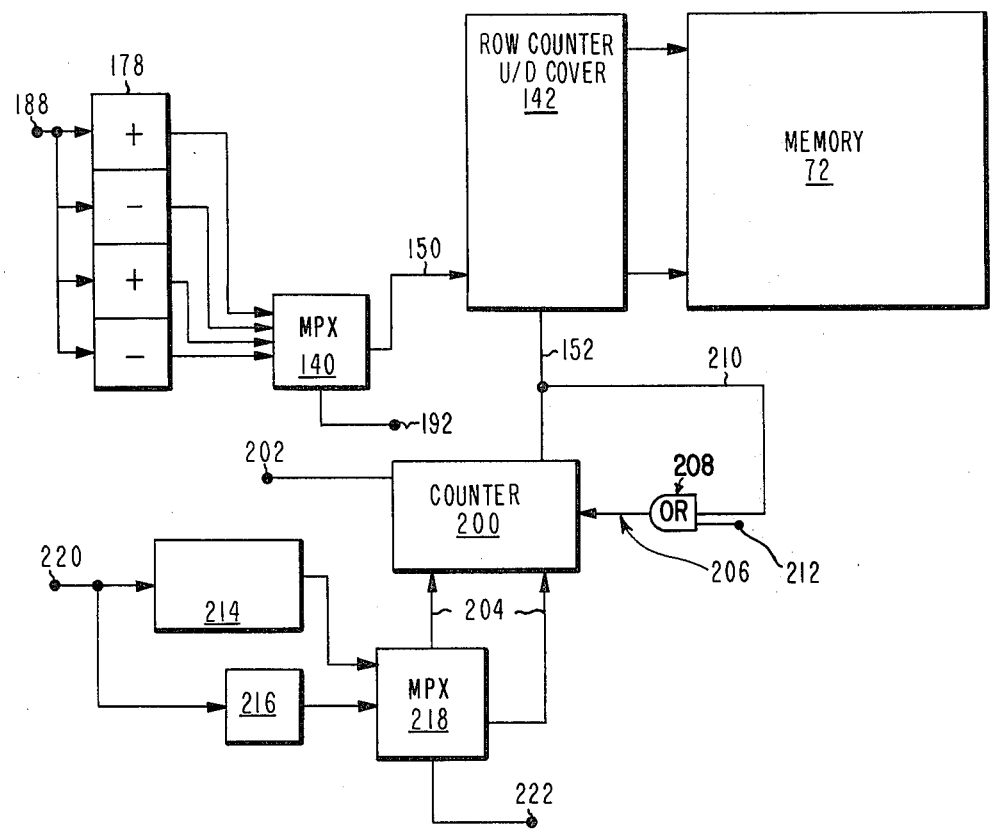
FIG. 11 shows, in block diagram form, the circuits in the row address pointer. The FIGURE shows one embodiment of the circuit to correct for skew.
Figure 15:
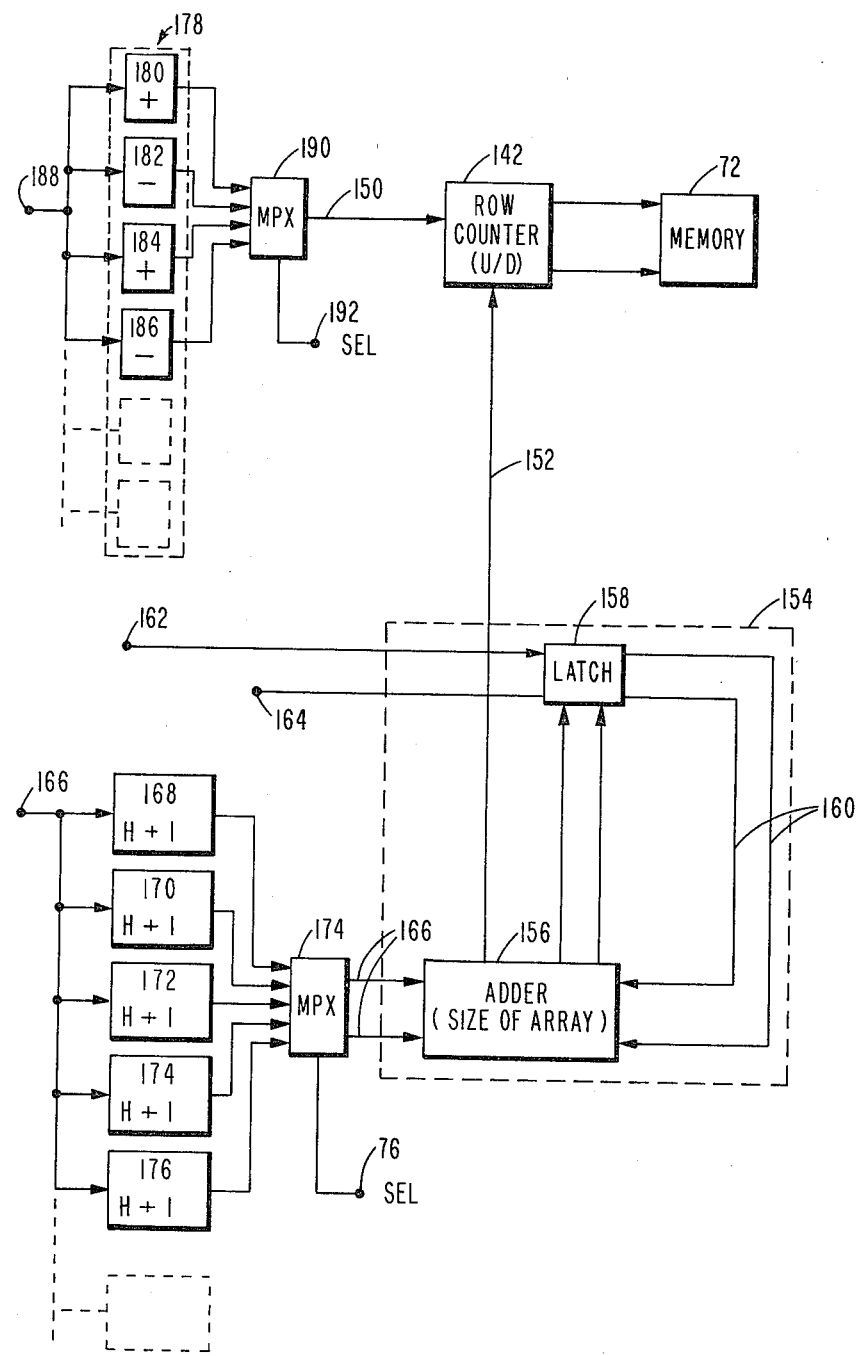
FIG. 15 shows an alternate embodiment of the circuits used to correct for skew.

Referring now to FIGS. 11 and 15, respectively, the other portion of the row address pointer means is shown. The circuits in the figures show alternate means for correcting the skew associated with the arrays.

As was described previously, the skew associated with a particular array is corrected by selectively changing the row address, in RAM 72, at which the data outputted from a particular array is stored. FIG. 15 shows one embodiment for addressing the memory to effectuate skew correction. The row of memory addressed is generated by row counter 142. The row counter is an Up/Down counter which has two controlled inputs 150 and 152, respectively and a plurality of output address lines which transmit the appropriate memory row position or address for storing incoming data. The controlled signal on control input 152 is a controlled pulse which selectively steps the contents of the row counter to select a new memory row address after data from a segment length of an active array is stored. The pulse on terminal 152 is generated from accumulator 154. The accumulator 154 includes adder 156 and latch 158. The input to latch 158 is connected to the output of adder 156. The output from latch 158 is fed back over conductors 160 to the input of the adder. A control pulse on terminal 162 clears latch 158. The pulse is generated when the first pixel of an array is accessed. Data from the adder is transferred into latch 158 when strobe pulse on line 164 is active. The strobe pulse is generated from the pel clock. The pel clock is synchronized to output a clock pulse simultaneously with a data bit outputted from an array. This means that whenever a pel in an array is examined a pulse is generated on strobe pulse line 164. The presence of a pulse on the strobe pulse line transfers the data in adder 156 into latch 158. In addition to the data supplied on conductors 160, data is also supplied on conductors 166. The data on conductors 166 is the contents of skew correction registers 168 and 170, respectively. The value loaded in the register is the skew correction factor identified above as (H+1). Selection of the register whose contents is to be loaded into the adder is done by multiplexor means 174. The multiplexor means 174 is enabled by a select signal on terminal 76. The signal on terminal 76 identified the array whose data is being loaded into memory 72. It is worthwhile noting that skew correction registers 168 and 170 are dedicated, that is, each register holds a skew correction factor for a particular array. It should also be noted that if the number of arrays used for scanning a full line on an original document are greater than two arrays, then the number of skew correction registers are greater. In other words, the number of skew correction registers are identical to the number of arrays used in the scanner.

The control signal on terminal 150 enables Up/Down counter 142 to count up or to count down. The control signal reflects the contents of skew direction register 178. The skew direction register includes a plurality of cells with one cell dedicated to a particular array of the scanner. By way of example, a 1 in cell 180 of the skew direction register indicates that the skew of the first array is positive. Likewise, a 0 in cell 180 indicates that the skew in the first array is negative. The other cell, 182 is used to identify the direction of skew for the other array. The data is loaded into the cells over terminal 188. The value is calculated and supplied by the microprocessor. The contents of the skew direction register is loaded onto conductor 150 by multiplexor means 190 when said multiplexor is controlled by a select pulse on terminal 192.

In operation the skew correction factor is loaded by the microprocessor over conductor 166 into one of the skew correction registers 168 or 170, respectively. The multiplexor buss 174 being enabled by a control signal on terminal 76 selects the skew correction register holding the skew information associated with the array whose data is being loaded in the memory. The value from the selected skew correction register is transferred into adder 156. The contents in latch 158 is cleared by a control pulse on terminal 162. Strobe pulse on terminal 164 transfers the data from adder 156 into latch 158 as each pixel is accessed. The data which is latched in latch 158 is transferred on feedback conductors 160 into adder 156 where the contents of the latch is added to the data on conductor 166. This process continues until the adder has an overflow which is a signal on terminal 152. The signal on terminal 152 steps the contents in Up/Down counter 142 while the direction of count is identified by the signal on terminal 150.

FIG. 11 shows an alternate device which selects the row memory address to account for skew associated with the data outputted from a selected array. In the description of FIG. 11, devices which are identical with devices in FIG. 15 are identified by the same numeral. Similar to the embodiment described in FIG. 15 a carry-out bit on conductor 152 steps row counter 142 while the direction of count (that is the step direction) is generated by the signal on termianl 150. To this end, the devices and signals identified by numerals 190, 178, 188 and 192 are identical to similar elements described in accordance with the FIG. 15. The operation of these elements are identical to those previously described with respect to FIG. 15 and, therefore, will not be discussed any further.

The signal on terminal 152 is generated when the counter 200 overflows. The maximum length of counter 200 must be at least equivalent to the number of pixels used in each array. The counter 200 is stepped by the pixel clock on conductor 202. The enable signal which loads a number into the counter over conductors 204 is generated on conductor 206. Conductor 206 is connected to the output of OR gate 208. The OR gate is a two terminal input controller circuit. One of the inputs of the OR gate is connected to the carry out of counter 200 by conductor 210 while the other input is connected to controlled terminal 212. A control signal at terminal 212 tells when a first pel of an array is accessed. This means that the counter 200 will be loaded either after it overflows (that is a signal is outputted on conductor 152) or when the first pixel of an array is to be accessed in the scanner. The count in counter 200 is loaded from segment length registers 214 or 216 by means of multiplexor 218. The contents of registers 214 and 216, respectively, are loaded by the microprocessor over data buss 200. The count in each of the registers equals the length of the active pixels (of the array) reduced by the segment length. The selection of the register is done by multiplexor 218 when controlled by select signal 222.

In operation a number is loaded from either register 214 or 216, respectively. The number of counter 200 is equivalent to the length of an array reduced by the segment length. With the number loaded in counter 200, the pel clock begins to output control pulse on terminal 202 and the counter begins to count upward. When the number of pulses is equivalent to the number of pixels associated with the segment length, an overflow or carrybit is generated from counter 200 as a control pulse on terminal 152. This pulse steps the Up/Down counter 142 while a control signal on conductor 150 determines the direction which the counter counts. The output from the Up/Down counter generates the row address where a segment associated with a particular array must be stored. At the end of a segment or the accessing of a first pel to an array the register is again loaded and counted or stepped in a manner similar to that described.

Although the correction for skew, abutment, and alignment is done at the instant when data is loaded into the memory means it is worthwhile noting that the correction can be done at the instance when data is read out from the memory.

Although the above described invention is primarily concerned with the reconstruction of straight line of data, the teaching can be used to detect the edges of a document and hence eliminate registration errors from the document itself. In other words, an original document that is not aligned with the edge of the document platen can be reproduced so that the information on the copy is aligned with the edges of the copy paper.

Having thus described our invention, what we claim as new and desire to secure by Letters Patent is:

1. Method to automatically correct abutment, alignment and skew in the composite image of a continuous object being reproduced by the arrays of a multiple array scanner, said method comprising the steps of:
generating an electronic image of a test pattern;
analyzing the electronic image to obtain an alignment error, an abutment error and a skew error;
storing the errors; and
correlating the errors with the composite electronic image of the continuous object to generate thereafter a continuous image of the continuous object.

2. A method for correcting skew associated with the linear arrays of a multiarray scanner, said method comprising in combination:
generating an electronic image, said electronic image representing the skew associated with each array;
storing the electronic image in a storage;
determining the number of linear segments associated with the electronic image of the linear array;
determining the segment length for each segment; and
addressing storage so that data associated with adjoining linear segments of the array are being accessed at a storage location displaced relative to the last element in a preceding segment.

3. A method to effectuate abutment in the data outputted from the arrays of a multiple array scanner, said method comprising in combination:
positioning a test pattern at the object plane of the scanner; said test pattern being characterized by a straight horizontal line and an intersecting vertical perpendicular line, the intersection of both lines indicating the overlapping zone between the arrays;
generating at least two electronic images representative of the test pattern;
storing the electronic images in a storage;
determining the overlapping zone, for the arrays, from the stored electronic images; and
addressing storage so that data associated with the overlapping zone is being accessed at a beginning address displaced relative to either a first element or a last element of the overlapping zone.

4. A method for calibrating a multiarray scanner comprising the following steps:
  (a) disposing a test pattern at the document platen of the scanner, said test pattern being oriented in a desired position;
  (b) generating an electronic image of the test pattern;
  (c) storing the electronic image;
  (d) generating correctional factors representative of the deviation between the orientation of the test pattern and its electronic image;
  (e) storing the correctional factors;
  (f) generating electronic images of documents; and
  (g) utilizing the correctional factors to adjust the orientation of data generated from subsequent documents.

5. A method for dynamically correcting for abutment, alignment and skew variations between the arrays of a multiple array scanner whereby the output of the scanner is a composite electronic image of a line being scanned, said method comprising the steps of:
  sensing a test pattern;
  storing an uncorrected electronic image of the test pattern in storage;
  analyzing the uncorrected electronic image to ascertain pertinent points associated therewith;
  using the pertinent points to generate correctional factors for the abutment, alignment and skew; and
  applying the correctional factors to compensate for abutment, alignment and skew in data outputted from the scanner.

6. The method as claimed in claim 5 wherein the analyzing step for each array includes:
  establishing a memory reference zone;
  determining a first value for the right horizontal edge of the uncorrected electronic image;
  storing the first value;
  determining a second value for the left horizontal edge of the uncorrected electronic image;
  storing the second value;
  determining a third value of the left vertical edge of the uncorrected electronic image;
  storing the third value;
  determining a fourth value for the right vertical edge of the uncorrected electronic image; and
  storing said fourth value.

7. The method of claim 6 wherein an abutment correctional factor is being achieved by taking the algebraic sum of the third and/or fourth value; and storing the result.

8. The method of claim 6 wherein a skew correctional factor is being calculated by taking the algebraic difference of the second and first value, respectively; and
  storing a value representative of said algebraic difference.

9. The method of claim 5 wherein the alignment correctional factor includes the step of taking the difference between the value generated for the left horizontal edge of a first array and the value generated for the left horizontal edge of a subsequent right array; and storing the result.

10. In an array scanner wherein a document to be reproduced is disposed at the document platen of said scanner and an electronic image of the document is generated, a method to electronically adjust the scanner so that data in the electronic image is in proper orientation, said method comprising the following steps:
  (a) positioning a test pattern on the document platen;
  (b) scanning the test pattern to generate an electronic image of said test pattern;
  (c) storing the electronic image;
  (d) analyzing the electronic image to generate one or more correctional factors, with each correctional factor being representative of a dimensional defect associated with the electronic image of the test pattern;
  (e) storing the correctional factors;
  (f) generating an electronic image of the document to be reproduced;
  (g) correlating the correctional factors with dimensional defects in the document's electronic image; and
  (h) utilizing the correctional factors to adjust the document's electronic image to form an adjusted image free from the dimensional defects.

11. Apparatus for correcting skew, aligning and abutting the electronic image generated in a multiple array scanner comprising:
  means including the multiple array scanner operable for generating the image;
  means for analyzing the electronic image and to generate a skew correction factor, a misalignment correction factor and an abutment correction factor; and
  means for applying the correction factors to the electronic image to thereby correct dimensional errors associated with data scanned by the multiple array scanner.

12. In a multiple array scanner wherein an original document is placed at a document plane and a straight line of data on said document is being scanned by a plurality of arrays positioned in an offsetting relationship in the direction of scan and in an overlapping relationship in a direction parallel to the straight line of data the improvement comprising in combination:
  a predetermined test pattern, being positioned at the document plane;
  a scanning means including the arrays for scanning the test pattern;
  means for generating an electronic image representative of the test pattern;
  means for storing the electronic image;
  means for interrogating the electronic image to determine a skew error, an abutment error, an alignment error; and
  means for applying the skew error, the abutment error and the alignment error to reconstruct electronic images representing a straight line scanned from the original document.

13. The apparatus as claimed in claim 12 wherein the test pattern includes a first indicia being intersected by a second indicia whereby the point of intersection between said indicium substantially represent an overlap point between the array.

14. The apparatus as claimed in claim 13 wherein the first indicia includes a straight line, said line being positioned to run substantially parallel with a line of data on the original document.

15. The apparatus of claim 13 wherein the second indicia includes a line, said line being positioned substantially perpendicular to the line of data.

16. The apparatus of claim 12 wherein the storage means includes a controlled RAM.

17. The apparatus as claimed in claim 12 wherein the means for applying the abutment error includes a column pointer operable to define a storage address for storing incoming data whereat data generated by overlapping arrays are being arranged contiguously.

18. The apparatus of claim 17 wherein the pointer includes at least two registers, each register being associated with one of the scanner arrays;
first means for loading a starting memory column address into said registers;
control means operable to select the memory column address from one of the registers;
counting means operable to receive the contents of the selected register; and
control clock means operable to step the counter to thereby define sequential memory address.

19. The apparatus as claimed in claim 12 wherein the means for applying the alignment error includes a row pointer means operable to define a row position in the storing means so that incoming data is stored in linear alignment.

20. The apparatus of claim 19 wherein the row pointer means includes at least two registers each register being associated with at least one of the arrays;
first means for loading a memory row address into said registers;
means for stepping the contents of the register at the completion of a scan line;
means for sequentially selecting the register;
row counter means for accepting the contents of the selected counter; and
control clock means for stepping the counter.

21. The apparatus as claimed in claim 12 wherein the means for applying the skew error includes a row counter operable for defining sequential memory row addresses;
loading means operable for loading the memory row address; and
adjustment means operable to selectively adjust the row counter thereby changing the contents periodically.

22. In a multiple array scanner wherein a horizontal line of data from an original document is being scanned by a plurality of overlapping arrays the improvement conprising in combination:
a document plane for supporting an original document; said document plane having a controlled section and a working section;
a test pattern positioned within the controlled section;
scanning means including the arrays operable for scanning the pattern and outputting electrical signals;
means for intercepting the signals and outputting an electronic image indicative of the test pattern;
means for storing the electronic image;
controlling for analyzing the image and generating a skew error, an aligment error and an abutment error;
means for storing the errors; and
means for applying the errors thereafter to effectuate alignment, abutment and skew on data outputted from the scanner.

23. In a multiple array scanner wherein a straight line on an original document is being scanned by a plurality of overlapping arrays, the improvement comprising in combination:
an addressable storage means;
test pattern being positioned at the object plane of said scanner;
scanning means including the multiple arrays for scanning the test pattern;
means associated with the scanner and operable to generate an electronic image representative of the test pattern;
memory address pointer means operable to identify storage address whereat data outputted from the scanner is being accessed; and
enabling means including a controller operable for selectively adjusting the contents of the memory address pointer to effectuate electronic correction to thereby reconstruct a copy of the straight line.

* * * * *